(12) United States Patent
Huang

(10) Patent No.: US 9,671,082 B2
(45) Date of Patent: Jun. 6, 2017

(54) WARNING LAMP ASSEMBLY

(71) Applicant: Chih-Chiang Huang, New Taipei (TW)

(72) Inventor: Chih-Chiang Huang, New Taipei (TW)

( * ) Notice: Subject to any disclaimer, the term of this patent is extended or adjusted under 35 U.S.C. 154(b) by 413 days.

(21) Appl. No.: 14/560,362

(22) Filed: Dec. 4, 2014

(65) Prior Publication Data
US 2016/0161082 A1  Jun. 9, 2016

(51) Int. Cl.
| B60Q 1/26 | (2006.01) |
| F21S 8/10 | (2006.01) |
| F21V 7/06 | (2006.01) |
| F21S 10/06 | (2006.01) |
| F21W 111/00 | (2006.01) |
| F21Y 115/10 | (2016.01) |

(52) U.S. Cl.
CPC .......... *F21S 48/234* (2013.01); *B60Q 1/2611* (2013.01); *F21S 10/063* (2013.01); *F21S 48/215* (2013.01); *F21S 48/328* (2013.01); *F21V 7/06* (2013.01); *F21W 2111/00* (2013.01); *F21Y 2115/10* (2016.08)

(58) Field of Classification Search
CPC .......... B60Q 1/2607; B60Q 1/24; B60Q 1/38; B60Q 1/46; B60Q 1/2611; B60Q 1/2696; F21S 10/06; F21V 33/0076
USPC ................................................. 362/540–542
See application file for complete search history.

(56) References Cited

U.S. PATENT DOCUMENTS

| 3,266,014 A | * | 8/1966 | Leotta | B60Q 1/2611 340/321 |
| 3,710,098 A | * | 1/1973 | Walden | B63B 51/02 340/331 |
| 3,764,799 A | * | 10/1973 | Schulz | B60Q 1/2611 340/472 |
| 3,877,171 A | * | 4/1975 | Sloop | A63H 33/22 273/142 R |
| 4,054,791 A | * | 10/1977 | Du Shane | F21L 2/00 362/35 |
| 4,153,926 A | * | 5/1979 | Hurt | B60Q 1/2611 362/239 |

(Continued)

FOREIGN PATENT DOCUMENTS

TW  M367387  10/2009

*Primary Examiner* — William Carter
(74) *Attorney, Agent, or Firm* — Muncy, Geissler, Olds & Lowe, P.C.

(57) ABSTRACT

A warning lamp assembly includes a housing having an upper chamber and a bottom chamber; a driving unit; a gear mechanism including a rotary disk disposed within the upper chamber, and formed with an inwardly and radially extending retention flange, a bearing unit disposed on the retention flange so as to permit rotation of the disk relative to the upper chamber, a toothed wheel having outer peripheral teeth meshed with an axle of the driving unit and an inner periphery formed with downward projections slidably contacting the bearing unit and hence covering the same from above to prevent disengagement of the wheel from the rotary disk; a light source fixed within the upper chamber; and a parabolic reflector disposed on the wheel and covering the light source from above to reflect light rays emitted from the light source in a horizontal plane while simultaneously rotating together with the wheel.

11 Claims, 3 Drawing Sheets

(56) References Cited

U.S. PATENT DOCUMENTS

| | | | | |
|---|---|---|---|---|
| 4,229,781 A | * | 10/1980 | Hitora | B60Q 1/2611 340/473 |
| 4,231,078 A | * | 10/1980 | Hitora | B60Q 1/2611 362/35 |
| 5,160,874 A | * | 11/1992 | Lyons | B60Q 1/2611 318/268 |
| 5,517,388 A | * | 5/1996 | Hutchisson | B60Q 1/2611 362/284 |
| 7,819,538 B2 | * | 10/2010 | Nobayashi | B60Q 1/2611 362/277 |

* cited by examiner

WARNING LAMP ASSEMBLY

BACKGROUND OF THE INVENTION

1. Field of the Invention

The present invention relates generally to a warning lamp assembly, and more particularly to a vehicle warning lamp assembly, which is simple in structure, which requires only a relatively small light source but can emit light rays in a horizontal plane direction and which is durable in use and can dissipate heat effectively.

2. The Prior Arts

Warning lamp assemblies are widely used in construction sites or in industrial establishments, where dangers are possible to occur anytime and available at every corner. Another way of using is to provide it on vehicles (such as police cars, fire engines, road maintenance vehicles and ambulance) or at hazardous environments. A warning lamp assembly is installed generally at pedestrian precincts or on the vehicles so as to draw attention of nearby pedestrian. A conventional vehicle warning lamp assembly mounted on a vehicle generally includes a rotary light that emits colorful light rays intermittently so as to warn the nearby vehicle operators or the pedestrian. Such vehicle warning lamp assembly is usually fixed on a rooftop or a surrounding of a vehicle and the light rays emitted thereby should radiate to all directions so as to draw attention of those people happen to be nearby the vehicle.

It is noted that in order to radiate lights in every directions, a large number of light emitting diodes are employed in the conventional warning lamp assembly and hence generate a relatively high heat and consume a large amount of electrical power, thereby creating a non-friendly environment to the user and is against the trend of the manufacturers.

Taiwanese Patent Publication No. M367387 discloses a mechanical-rotary type LED warning lamp assembly that includes a bottom seat, a gear mechanism, a power collector plate, an LED circuit board, a power supply unit and a lamp lens. The gear mechanism is mounted on the bottom seat and includes a first fixing element, a motor, a second fixing element, an axle, a gear set and two conductors, wherein, the motor and the axle are respectively connected interactively to the gear set while the power collector plate is mounted on the axle and is connected electrically with the conductors. The LED circuit board is coupled electrically with the power collector plate and consists of a plurality of LED bulbs. The power supply unit is mounted in a chamber of the bottom seat, includes a power supply and an adaptor circuit board electrically coupled to the power supply and further with the motor and the conductors. The lamp lens is hermetically mounted on the bottom seat.

It is noted that the brush or carbon brush of the motor and the base driven thereby are subjected to wear out easily after long term of use, thereby causing damage to the warning lamp assembly. Moreover, implementation of a plurality of LED bulbs and the LED circuit board results in high manufacturing expense.

The LED bulbs are illuminated in sequence and rotated alternately according electronic design or mechanical design so as to emit light rays in different angles and directions, a relatively large amount of power is required such that the manufacturing expense thereof can not be reduced. The more the circuit board or the LED bulbs are used, the more heat is generated, which is required to be dissipated to an exterior thereof, failure of the same may result in poor illumination effect.

Since the presently existing warning lamp assembly includes complicated design structures and last only a short time, it is highly desired to develop a warning lamp assembly, which has simple structure, which requires a relatively small light source but can emit light rays in all direction and which is durable in use and can dissipate heat effectively.

SUMMARY OF THE INVENTION

A primary objective of the present invention is to provide a warning lamp assembly, which has simple structure, which requires a relatively small light source but can emit light rays in a horizontal plane direction and which is durable in use and can dissipate heat effectively.

A warning lamp assembly of the present invention includes a housing having an upper chamber and a bottom chamber below the upper chamber; a driving unit having an axle; a gear mechanism including a rotary disk disposed rotatably within the upper chamber and formed with an inwardly and radially extending retention flange, a bearing unit disposed on the retention flange so as to permit smooth rotation of the rotary disk relative to the upper chamber, a toothed wheel disposed on the rotary disk having outer peripheral teeth meshed with the axle of the driving unit and an inner periphery formed with a plurality of downward projections extending into and slidably contacting the bearing unit and hence covering the bearing unit from above in such a manner to prevent disengagement of the toothed wheel from the rotary disk; a light source fixed within the upper chamber of the housing; and a parabolic reflector disposed on the toothed wheel and covering the light source from above to reflect light rays emitted from the light source in a horizontal plane while simultaneously rotating together with the toothed wheel. The bottom chamber of the housing is formed with mounting means for mounting the warning lamp assembly on a desired vehicle.

One specific feature of the present invention is that activation of the driving unit results in rotation of a drive gear, which, in turn, is fixed on the axle so as to mesh with the toothed wheel such that the toothed wheel and the rotary disk rotate simultaneously smoothly within the upper chamber owing to the presence of the bearing unit between the toothed wheel and the rotary disk. The corresponding element, such as the parabolic reflector is also driven smoothly with little friction. Implementation of the brushless motor simplifies the vehicle warning lamp assembly of the present invention, hence prolongs the service life thereof.

Another specific feature of the present invention resides in that use of LED COB (LED Chip on Board) and the feather-like parabolic reflector enable the light rays to radiate in the horizontal plane direction without the requirement of setting other mechanisms, hence reduces the manufacturing expense of the vehicle warning lamp assembly of the present invention.

Yet another specific feature of the present invention resides in that the heat generated by the light source is absorbed by and is conducted to the heat dissipation fins formed in the bottom chamber of the housing. Since the peripheral wall confining the bottom chamber is further formed with a plurality of ventilation holes, which spatially communicate the bottom chamber to an exterior of the housing, the heat entrapped within the bottom chamber flows out to the exterior of the housing, thereby effectively dissipating the generated heat and hence prolonging the service life of the light source.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

The accompanying drawings are included to provide a further understanding of the invention, and are incorporated in and constitute a part of this specification. The drawings illustrate embodiments of the invention and, together with the description, serve to explain the principles of the invention.

Figure 1:
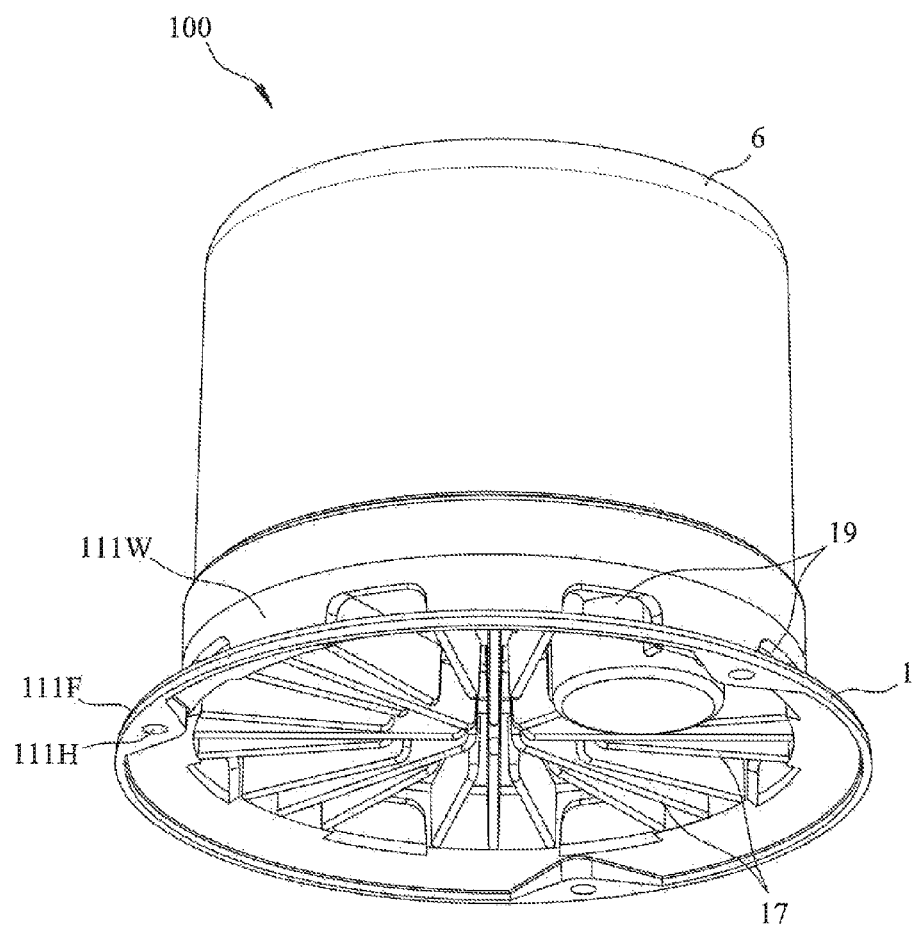
FIG. 1 is a perspective and bottom view of a warning lamp assembly of the present invention for vehicles.
Figure 2:
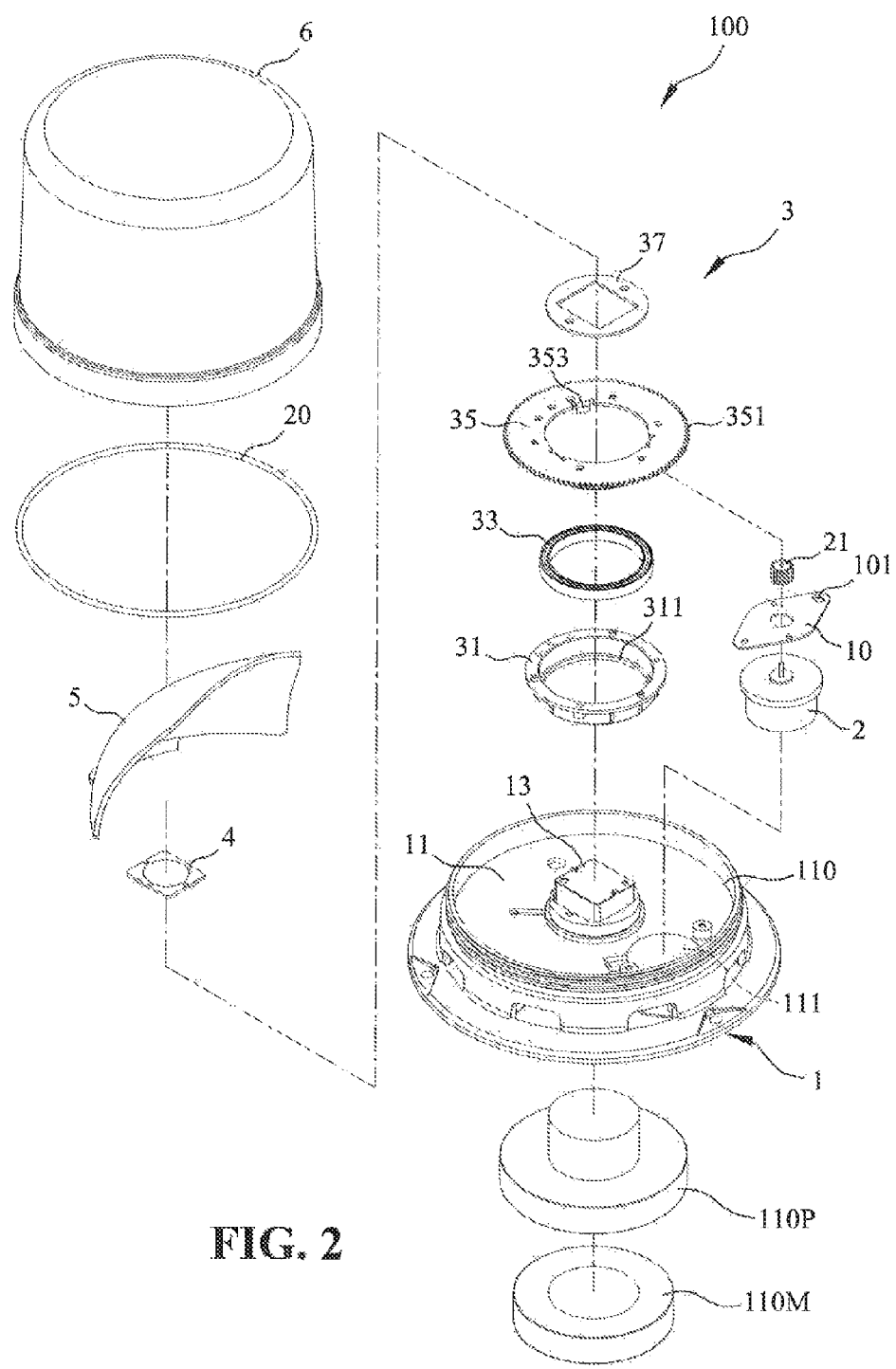
FIG. 2 is an exploded view of the warning lamp assembly of the present invention.

Referring to FIGS. 1 and 2, wherein FIG. 1 is a perspective and bottom view of a warning lamp assembly of the present invention and FIG. 2 is an exploded view of the warning lamp assembly of the present invention. As illustrated, the warning lamp assembly 100 of the present invention includes a housing 1, a driving unit 2, a gear mechanism 3, a light source 4, a parabolic reflector 5 and a colored dome 6.

The housing 1 has an upper chamber 110 and a bottom chamber 111 below the upper chamber 110. Preferably, the housing 1 can be fabricated from aluminum alloy in order to withstand the durability of usage. The upper chamber 110 is formed with a circular seat and a post 13 erected on the circular seat. The circular seat preferably has stepped portion at its exterior. The post 13 is generally rectangle or any other configurations.

The driving unit 2 is installed within the bottom chamber 111 of the housing 1, includes an axle and a drive gear 21 mounted on the axle. In this embodiment, the bottom chamber 111 is confined by a peripheral wall 111W below the circular seat for receiving a brushless motor therein such that the axle of the motor extends perpendicularly into the upper chamber 110 for carrying the drive gear 21 thereon. Note that a synchronous direct current motor can serve the purpose of the brushless motor. The vehicle warning lamp assembly 100 of the present invention further includes a fixing element 10 disposed between the driving unit 2 and the drive gear 21. The fixing element 10 is preferably a plate, and further includes two fastener screws extending through the holes 101 in the plate 10 for engaging the screw holes in the upper chamber 110. A direct current brushless synchronous electric motor or any other driving system can serve as the driving unit 2 so long as it can activate and deactivate the drive gear 21.

Referring again to FIG. 1, the bottom chamber 111 of the housing 1 further has a plurality of angularly spaced heat dissipation fins 17 extending inwardly and radially from the peripheral wall 111W to terminate adjacent to an axis of the bottom chamber 111. Moreover, the peripheral wall 111W is further formed with a plurality of ventilation holes 19 (which function as dissipation fins), which spatially communicate the bottom chamber 111 to an exterior of the housing 1. Preferably, the bottom chamber 111 further has an annular flange 111F that extends radially and outwardly from the peripheral wall 111W and that is formed with three fastener holes 111H to permit extension of fastener screws for mounting the warning lamp assembly on a desired vehicle.

Figure 3:
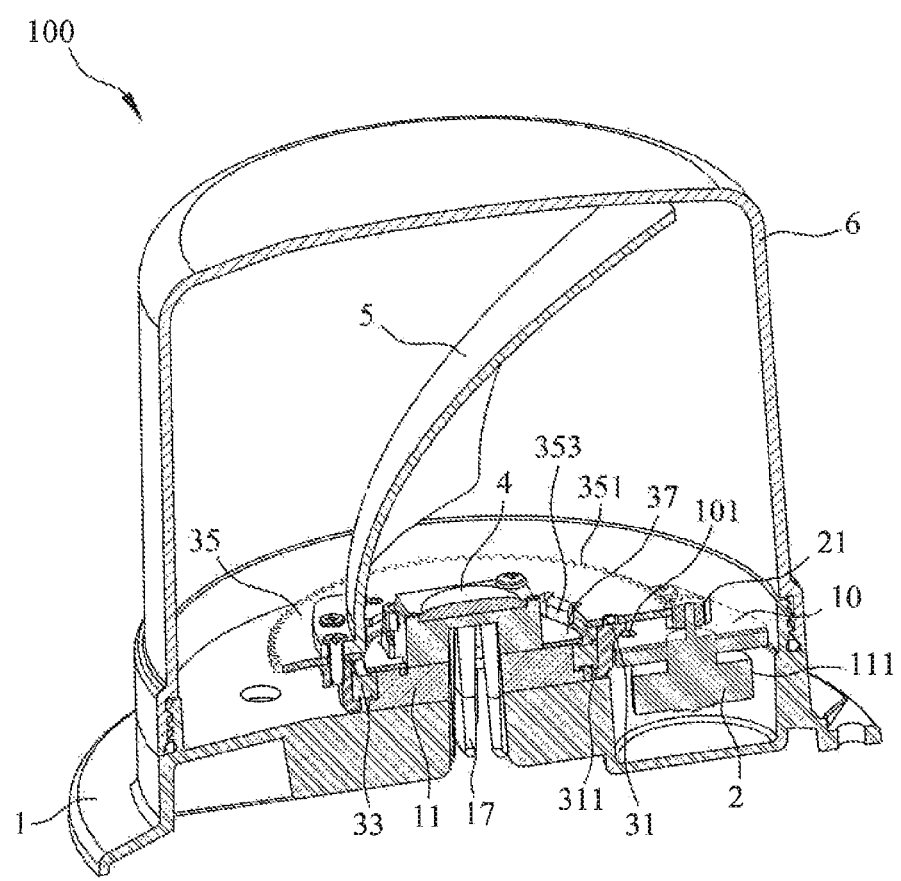
FIG. 3 is a fragmentary cross sectional view the warning lamp assembly of the present invention.

FIG. 3 is a fragmentary cross sectional view the warning lamp assembly of the present invention, As shown, the gear mechanism 3 includes a rotary disk 31 sleeved rotatably around the circular seat and formed with an inwardly and radially extending retention flange 311, a bearing unit 33 disposed on the retention flange 311 so as to be sandwiched between the circular seat and the rotary disk 31, a toothed wheel 35 that is disposed on the rotary disk 31 and that has outer peripheral teeth 351 meshed with the drive gear 21 and an inner periphery formed with a plurality of downward projections 353 extending into the rotary seat 311 and slidably contacting the outer periphery of the bearing unit 33.

The gear mechanism 3 further includes a bearing-retention pad 37 fixed on the circular seat and covering the bearing unit 33 from above in such a manner the bearing unit 33 is sandwiched between bearing-retention pad 37 and the retention flange 311 of the rotary disk 31. Under this condition, the toothed wheel 35 is prevented from disengaging the rotary disk 31 and no oiling is required to permit smooth rotation of the toothed wheel 35. Note that after assembly, the retention flange 311 of the rotary disk 31 is generally flush with the stepped portion of the circular seat so as to provide stable positioning of the rotary disk 31 relative to the circular seat, the partition floor 11 between the upper and lower chambers 110, 111. Preferably, the partition floor 11 is formed with a plurality of heat dissipation holes communicating spatially the upper and bottom chambers 110, 111.

The light source 4 is fixed on the lamp post 13. Preferably, in this embodiment, an LED unit (such a single high powered Light-Emitting Diode) serves as the light source, is in form of a chip and is fabricated directly on a circuit board.

The parabolic reflector 5 is disposed on the toothed wheel 35 to reflect light rays emitted from the light source 4 in a horizontal plane direction while simultaneously rotating together with the toothed wheel 35. The parabolic reflector 5 is fabricated from high quality polymer resin (such as polycarbonate), has a curved reflecting surface, which is configured as a feather, which faces toward the light source 4 and which is undergone a vacuum plating process to enhance the light reflection effects. Preferably, the curved reflecting surface is coated with a highly reflective material or reflection layer (not visible) for further enhancing the light reflection effects.

The colored dome 6 is mounted on the housing 1 for enclosing the driving unit 2, the gear mechanism 3, the light source 4 and the parabolic reflector 5 therein. In order to prevent waste or humidity from getting interior of the dome 6, a rubber O-seal ring 20 is disposed between the housing 1 and the dome 6 to provide hermetically sealing effects. Preferably, the domed 6 has an inner or outer surface undergone polishing process to provide smoothness, thereby enhancing the illumination effects of the light source.

An important to note is that the warning lamp assembly 100 of the present invention further includes mounting means for mounting the warning lamp assembly on a desired vehicle. Preferably, the mounting means is constituted by the three fastener holes 111H in the annular flange 111F of the bottom chamber 111, the three fastener screws (see FIG. 1), a heavy duty annular magnet 110M and a mounting pole 110P (see FIG. 2) which are adapted to be disposed in the bottom chamber 110 of the housing 1 and via which the warning lamp assembly 100 of the present invention can be mounted on the desired vehicle.

As explained above, activation of the driving unit 2 results in rotation of the drive gear 21, which, in turn, drives the toothed wheel 35 and the rotary disk 31 to rotate simultaneously smoothly around the circular seat owing to the presence of the bearing unit 33 between the circular seat and the rotary disk 31. The corresponding element, such as the parabolic reflector 5 is also driven smoothly with little friction. Implementation of the brushless motor simplifies the vehicle warning lamp assembly of the present invention, hence prolongs the service life thereof.

One specific feature of the present invention resides in that use of LED COB (LED Chip on Board) and the feather-like parabolic reflector enable the light rays to radiate in the horizontal plane direction without the requirement of setting other mechanisms, hence reduces the manufacturing expense of the vehicle warning lamp assembly of the present invention.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A warning lamp assembly comprising:
   a housing having an upper chamber and a bottom chamber below said upper chamber,
   a driving unit having an axle;
   a gear mechanism including a rotary disk disposed rotatably within said upper chamber, and formed with an inwardly and radially extending retention flange, a bearing unit disposed on said retention flange so as to permit smooth rotation of said rotary disk relative to said upper chamber, a toothed wheel disposed on said rotary disk having outer peripheral teeth meshed with said axle of said driving unit and an inner periphery formed with a plurality of downward projections extending into and slidably contacting said bearing unit and hence covering said bearing unit from above in such a manner to prevent disengagement of said toothed wheel from said rotary disk;
   a light source fixed within said upper chamber of said housing; and
   a parabolic reflector disposed on said toothed wheel and covering said light source from above to reflect light rays emitted from said light source in a horizontal plane while simultaneously rotating together with said toothed wheel;
   wherein, said bottom chamber of said housing is formed with mounting means for mounting the warning lamp assembly on a desired vehicle.

2. The warning lamp assembly according to claim 1, further comprising a colored dome mounted threadedly onto said housing, thereby covering said driving unit, said gear mechanism, said light source and said parabolic reflector, and a rubber O-ring between said housing said colored dome to provide hermetically sealing effect therebetween.

3. The warning lamp assembly according to claim 1, wherein a direct current brushless motor serves as said driving unit, which is disposed in said bottom chamber of said housing with said axle extending into said upper chamber to meshed with said outer peripheral teeth of said toothed wheel.

4. The warning lamp assembly according to claim 1, wherein said bottom chamber is defined by a peripheral wall formed with a plurality of ventilation holes, which spatially communicate said bottom chamber to an exterior of the housing.

5. The warning lamp assembly according to claim 4, wherein said bottom chamber further has an annular flange that extends radially and outwardly from said peripheral wall and that is formed with three fastener holes to permit extension of fastener screws for mounting said warning lamp assembly on said desired vehicle.

6. The warning lamp assembly according to claim 4, further comprising a heavy duty annular magnet and a mounting pole which are adapted to be disposed in said bottom chamber of said housing for mounting said warning lamp assembly on said desired vehicle.

7. The warning lamp assembly according to claim 6, wherein said three fastener holes in said annular flange of said bottom chamber, said three fastener screws, said heavy duty annular magnet and said mounting pole cooperatively constitutes said mounting means.

8. The warning lamp assembly according to claim 1, wherein a single high powered Light-Emitting Diode serves as said light source, said single high powered Light-Emitting Diode being in form of a chip and fabricated on a circuit board.

9. The warning lamp assembly according to claim 1, wherein said parabolic reflector is fabricated from high quality polymer resin, has a curved reflecting surface that faces toward said light source and that has undergone a vacuum plating process to reflect emitted lights from said light effectively along said horizontal plane.

10. The warning lamp assembly according to claim 1, wherein said bottom chamber of said housing has a peripheral wall confining said bottom chamber and a plurality of angularly spaced heat dissipation fins extending inwardly and radially from said peripheral wall to terminate adjacent to an axis of said bottom chamber.

11. The warning lamp assembly according to claim 10, wherein said housing further has a partition-floor between said upper and bottom chambers, said partition floor being formed with a plurality of heat dissipation holes communicating spatially said upper and bottom chambers.

\* \* \* \* \*